Figure 1:
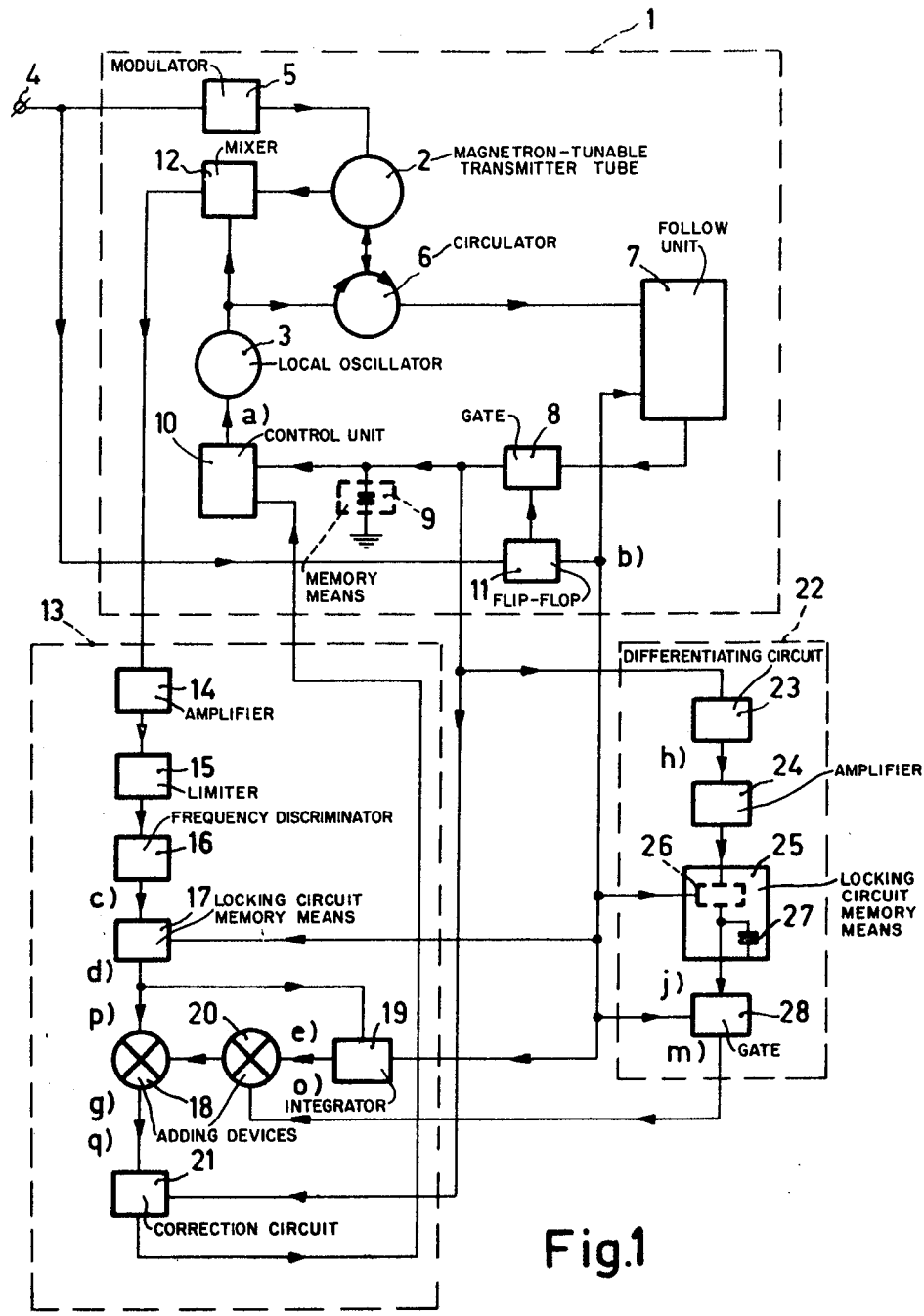

United States Patent

[11] 3,611,380

| [72] | Inventor | Nils Rune Carlsson<br>Stockholm, Sweden |
|---|---|---|
| [21] | Appl. No. | 829,282 |
| [22] | Filed | June 2, 1969 |
| [45] | Patented | Oct. 5, 1971 |
| [73] | Assignee | U.S. Philips Corporation<br>New York, N.Y. |

[54] DEVICE FOR FREQUENCY CORRECTION IN A RADAR EQUIPMENT
6 Claims, 4 Drawing Figs.

[52] U.S. Cl. .................................................. 343/17.2 R
[51] Int. Cl. .................................................. G01s 9/02
[50] Field of Search............................................ 343/17.1, 17.2

[56] References Cited
UNITED STATES PATENTS

| 3,168,736 | 2/1965 | Backmark et al. ............ | 343/17.1 |
| 3,249,937 | 5/1966 | B.O.As et al. ................ | 343/17.2 X |
| 3,290,678 | 12/1966 | Carlsson ...................... | 343/17.1 |
| 3,358,282 | 12/1967 | Wasterlid ..................... | 343/17.2 X |
| 3,365,718 | 1/1968 | Borg ............................ | 343/17.2 |

Primary Examiner—Malcolm F. Hubler
Attorney—Frank R. Trifari

ABSTRACT: A device for frequency correction in radar equipment having a tunable transmitting tube with means for continually varying the tuning frequency and triggering the transmitting tube to generate and transmit radar pulses of varying frequency. A local oscillator of a receiver is locked in frequency at the triggering moment to a value which is related in a predetermined manner to the frequency of the transmitted pulse. This value is maintained during an interval after triggering to produce a predetermined, constant intermediate frequency when combined with received echo pulses. Further corrections are produced in an automatic frequency regulation circuit to correct for the combination of slow regulation and rapid final correction, and in a correction circuit to compensate for deviations in the difference frequency dependent upon where triggering occurs on the tuning curve.

DEVICE FOR FREQUENCY CORRECTION IN A RADAR EQUIPMENT

The invention refers to a device for frequency correction in a radar equipment comprising a tunable transmitter tube with means for continuous variation of the tuning frequency of the transmitter tube and means for instantaneous excitation, triggering, of the transmitter tube for generation and transmission of radar pulses of varying frequency, and a receiver comprising a local oscillator which by means of memory means is locked in frequency in the triggering moment to a value which is related in a predetermined manner to the frequency of the transmitted pulse, upon which value it is maintained during a certain interval after triggering for producing a predetermined, constant intermediate frequency when combined with received echo pulses. In a known system the predetermined relationship between the tuning frequency representing the frequency of the transmitted pulse and the local oscillator frequency in the triggering moment is produced thereby that the local oscillator in an interval before triggering is slaved to the magnetron so that its frequency in the said interval in each moment coincides with the tuning frequency in unexcited condition (cold frequency) of the magnetron. The slaving is made ineffective in the triggering moment and the local oscillator frequency locked to a value which is for example equal to the value in the triggering moment. If for example in such a radar equipment operating with transmission of from pulse-to-pulse varying frequency the local oscillator is locked in frequency to a value which is equal to the cold frequency of the magnetron in the triggering moment, the arising intermediate frequency will be substantially equal to the difference between the cold frequency and the warm frequency of the magnetron in the triggering moment. The distance between the cold and warm frequencies of the magnetron can, however, vary between different parts of the tuning curve and can also be different for different magnetrons or vary with time due to temperature variations, ageing etc. If for the frequency control of the local oscillator only that information is used, which is represented by the frequency value in the triggering moment, this should consequently result in a great variation of the intermediate frequency. In order to correct the local oscillator frequency and decrease the band width of the intermediate frequency it is known to produce a difference frequency by combining the transmitted pulse and the locked oscillator frequency, which difference frequency is applied to a frequency discriminator, which is sensitive for the deviation of the difference frequency from the predetermined intermediate frequency. This deviation represented by a voltage pulse is then fed to the frequency determining circuit of the local oscillator for producing a rapid correction of the oscillator frequency immediately after the transmission to a value which substantially results in the predetermined intermediate frequency together with the frequency of the transmitted pulse. The result of the correction can, however, not be supervised because, when the regulation is made, one of the measured magnitudes, namely the transmitted pulse, has already disappeared. This pulse-to-pulse correction, which is effected in an open regulation circuit, is determined by the transmission constant in the regulation circuit, which constant can, however, vary with different magnitudes, as the tuning frequency, the size of the deviation etc. If it shall be possible to make this rapid final correction with high accuracy for producing an intermediate frequency signal having a small band width therefore the correction must be small. As soon as large final corrections are required it has been proved that the accuracy in the frequency regulation decreases and the intermediate frequency signal will have a larger band width.

In order to decrease the size of this correction of the local oscillator frequency varying from pulse to pulse it has previously been proposed to make a further correction, which appears in time before the said final correction but which is based upon a large number of previously measured frequency deviations, the said further correction being carried through such that the mean value of a large number of previous voltage pulses representing the deviation between the difference frequency appearing in the transmission moment and the required intermediate frequency will be zero. It is realized that if the mean value of the said correction pulses is made equal to zero the pulses will have alternating polarity and minimum amplitude. By maintaining information about the frequency of the pulses from pulse to pulse (the determination of the mean value) and feeding back information from foregoing measurements to the controlled local oscillator this regulation or correction will be effected in a closed regulation circuit, in which the error voltage, which is regulated to zero, is formed by the mean value of the said correction pulses. This correction will take care of slow variations in the mean distance between the cold and warm frequencies of the magnetron and will prevent that such deviations will result in a corresponding increase of the amplitude of the pulse-to-pulse final correction.

By the invention a further decrease of the amplitude of the frequency correction appearing after the transmission will be obtained resulting in a further essential improvement of the small bandwidth of the intermediate frequency signal.

The characteristic of the invention consists in that a radar equipment of described kind, which comprises a frequency discriminator, to which is applied the difference frequency between the transmitted pulse and the locked oscillator frequency in the transmission moment and which discriminator delivers a voltage pulse representing the deviation of the said difference frequency from the predetermined intermediate frequency, and also comprising memory means for storing the value of the voltage pulse during the echo time interval, which pulse is applied to the frequency determining circuit of the local oscillator for correcting the oscillator frequency in the transmission moment, a further correction circuit is arranged comprising means sensitive for the tuning variation of the transmitter tube with time, i.e. the derivative of the tuning curve, and memory means for storing the derivative value existing in the triggering moment during the echo time interval, which memory means are adapted to influence the frequency determining means of the local oscillator in the triggering moment for producing a correction of the oscillator frequency appearing before the transmission and corresponding to the measured derivative value. This further precorrection which suitably appears together with and as a superposition upon the previously described slow regulation, which is based upon a mean value determination of the correction pulses appearing in the transmission moment, will vary from pulse to pulse and will take care of such variations in the obtained difference frequency, which are derivative dependent, for example such variations which depend upon the tuning change caused by the time delay between the triggering and transmission moments, "hysteres" in the magnetron curve etc.

The invention is illustrated in the accompanying drawings, in which

Figure 2:
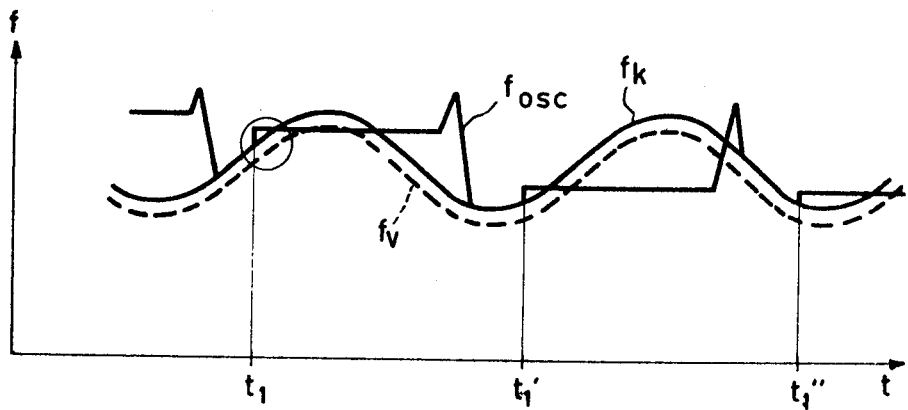
Figure 3:
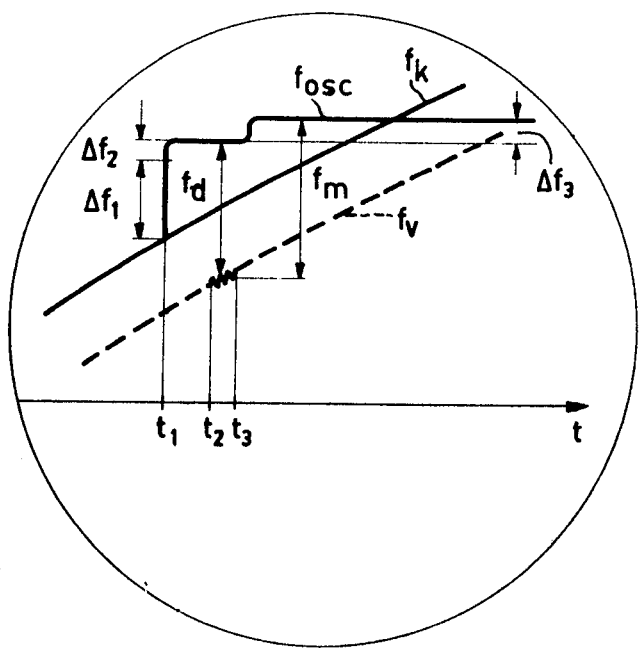
Figure 4:
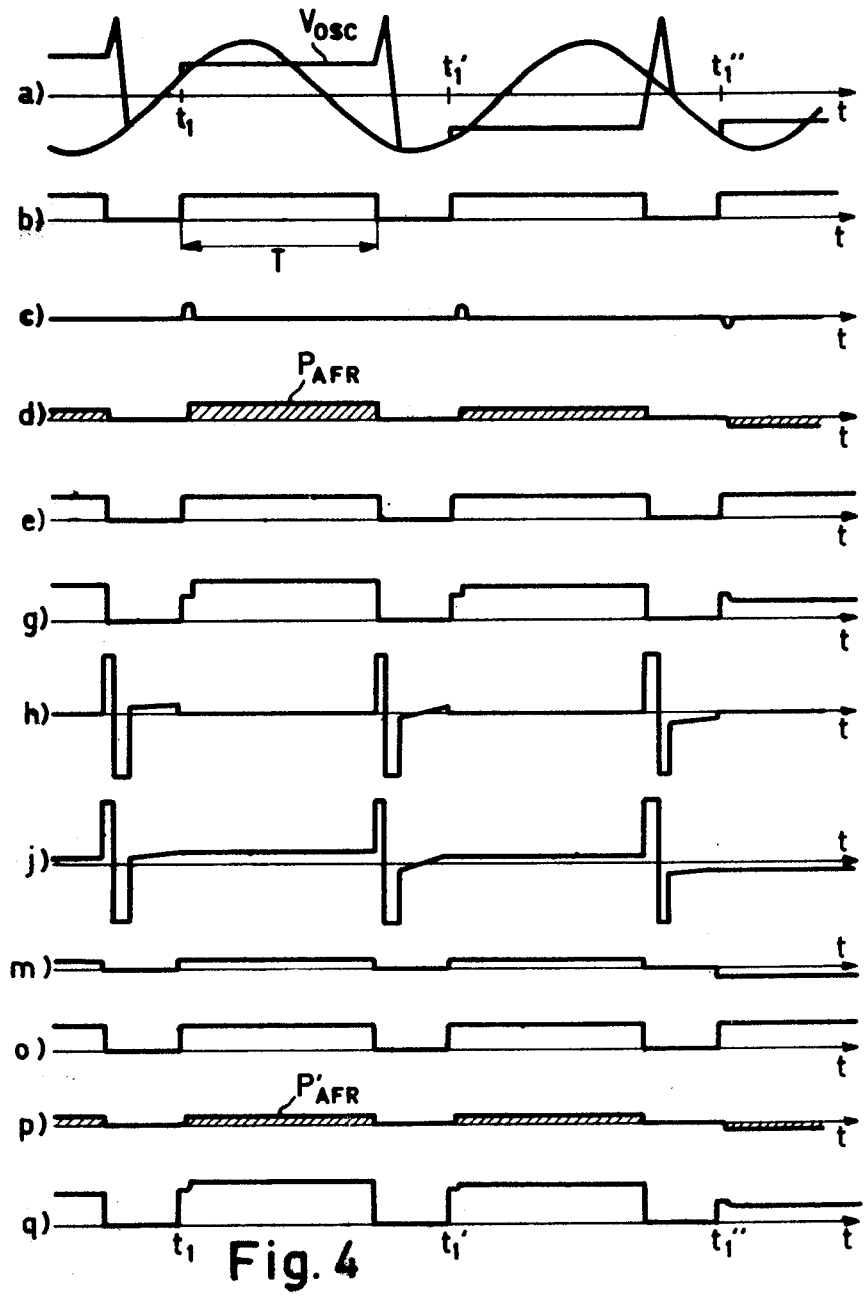

FIG. 1 shows a block diagram of a radar equipment comprising a correction device according to the invention, FIG. 2 shows the frequency variations of the magnetron and the local oscillator with time in the device according to FIG. 1, FIG. 3 shows an enlarged section of FIG. 2 and FIG. 4 shows some time diagrams representing the voltage in certain points of the device according to FIG. 1.

In FIG. 1 reference numeral 1 designates a schematically shown radar equipment, which is adapted to transmit radar pulses of varying frequency. The equipment comprises a continuously tunable magnetron 2, which can be of the type described in U.S. Pat. No. 2,931,943 and a local oscillator 3. The oscillator is included in a receiver and its output voltage is used in usual way for producing an intermediate frequency in combination with echo pulses. Triggering of the magnetron is effected by means of external pulses, which are applied to a modulator 5 via a terminal 4. The triggering is assumed to take place at moments, which are not related to the tuning variations of the magnetron 2, whereby the generated pulses will have a frequency which varies at random from pulse to pulse. In order to control the local oscillator 3 such that it independently of the frequency of the transmitted pulse will produce a constant intermediate frequency together with reflected echo pulses, it is necessary to provide a control voltage in an interval before triggering slaved to the magnetrons so that its frequency in each moment coincides with the tuning frequency of the magnetron in unexcited condition (cold frequency). The slaving is produced in a closed regulation circuit which can be of the kind described in U.S. Pat. No. 3,249,937 and which is only schematically indicated in FIG. 1. The regulation circuit comprises a circulator 6 which leads the output power of the local oscillator to the tuned circuit of the magnetron and further leads the oscillator power reflected from the tuned circuit to a follow unit 7. This produces by means of the reflected power a control voltage, which via a gate 8 and a memory capacitor 9 is led to a control unit 10 for the oscillator 3. The follow unit 7 comprises according to the said patent means for frequency modulation of the oscillator 3, which frequency modulation by reflection in the tuned circuit of the magnetron is converted to an amplitude modulation, which is detected by means of a detector included in the unit 7. The detector signal will then as to size and polarity represent the deviation of the oscillator frequency from the tuning frequency and is used to influence the oscillator such that the said deviation will be zero. An echo time flip-flop 11 is switched by means of the triggering pulse, which is fed to the terminal 4, and closes the gate 8 in the triggering moment. The memory capacitor 9 thereafter stores a control voltage which is equal to the value existing in the triggering moment. The flip-flop 11 which is of monostable type remains in its set position during the whole echo time interval or listening interval and is thereafter reset to the initial position.

If no further measures were taken the resulting intermediate frequency at reception of echo pulses and combination of these with the local oscillator frequency should be substantially equal to the difference between the magnetron tuning frequency in unexcited condition or the cold frequency and the tuning frequency in excited condition or the warm frequency. This difference is, however, as mentioned different at different parts of the tuning curve and can further vary with age, temperature and can vary from magnetron to magnetron. In order to compensate these deviations a small portion of the power of the radar pulse is led to a mixer 12 which furthermore receives power from the local oscillator 3. The mixer 12 delivers an output signal which represents the difference frequency and which is used to correct the frequency of the local oscillator to correct value.

The function is illustrated by the curves in FIG. 2, where $f_k$ is the cold frequency of the magnetron, $f_v$ the warm frequency and $f_{osc}$ the local oscillator frequency. The triggering moments are designated $t_1$, $t_1'$, $t_1''$. As shown in the figure the local oscillator and the cold frequency are equal until the triggering moment. In this moment the oscillator frequency is corrected in a manner to be described closer in the following and is then maintained constant during the echo time or the listening time. At the end of the listening time interval the oscillator is brought to make a rapid frequency sweep to a value beyond the tuning range and immediately thereafter a rapid frequency sweep across the tuning range, until coincidence with the magnetron frequency occurs, when the described slaving is made effective again. The devices for producing the frequency sweeps and reactivating the described slaving form no part of the present invention and are not described in detail.

FIG. 3 shows an enlarged section of the diagram according to FIG. 2 for illustrating the principles of the frequency correction according to the invention. Triggering occurs at $t_1$ and pulse transmission between $t_2$ and $t_3$. In the triggering moment a first correction or precorrection of the local oscillator frequency is made, which correction is divided in two steps $\Delta f_1$ and $\Delta f_2$. After the pulse transmission a final correction $\Delta f_3$ is made. The correction $\Delta f_3$ is derived from the difference frequency $f_d$ as measured in the pulse transmission moment and so dimensioned that the resulting difference frequency $f_m$ as close as possible equals the predetermined intermediate frequency. The first portion $\Delta f_1$ of the precorrection is dependent upon the final correction at a large number of previous pulse transmissions and more closely dimensioned such that the mean value of the correction $\Delta f_3$ for these foregoing pulses is zero. The correction $\Delta f_1$ is carried through in a closed regulation circuit having a large time constant, whereby the value of $\Delta f_1$ can vary only very slowly with time. The correction represented by $\Delta f_1$ can be called slow AFR (automatic frequency regulation), while the correction $\Delta f_3$ which varies from pulse to pulse can be called rapid AFR.

According to the invention a further precorrection is made represented by $\Delta f_2$ in FIG. 3, which correction is controlled by the derivative of the tuning variation of the magnetron with time. $\Delta f_2$ can for example be made proportional to the measured derivative in the triggering moment. Like $\Delta f_3$, $\Delta f_2$ will vary from pulse to pulse and will further decrease the size of the required final correction $\Delta f_3$.

The combination of the slow regulation $\Delta f_1$ and the rapid final correction $\Delta f_3$ has previously been proposed and is described in Swedish Pat. No. 212,257. The corrections $\Delta f_1$ and $\Delta f_3$ are produced by an AFR-circuit 13 (FIG. 1) which is now to be described briefly under reference to the diagrams $(a)$–$(AQ)$ in FIG. 4.

The first diagram $(a)$ in FIG. 4 shows the control voltage $v_{osc}$ which also represents the local oscillator frequency and in the next diagram $(b)$ the output signal from the echo time flip-flop 11 is shown. The listening time interval is designated T.

The AFR-circuit 13 is fed with pulses from the mixer 12 representing the difference ($f_d$ in FIG. 3) between the frequency of the oscillator and the frequency of the transmitted pulses, which difference frequency pulses after amplification in an amplifier 14 and limitation in a limiter 15 are fed to a frequency discriminator 16. This delivers for each received pulse an output voltage pulse, the amplitude and polarity of which indicates the deviation of the difference frequency $f_d$ from a predetermined intermediate frequency, for example 30 Mc./s. The output pulses from the discriminator 16 are shown in the diagram $(c)$ in FIG. 4. The discriminator pulses are applied to a locking circuit 17, to which furthermore the output voltage from the echo time flip-flop 11 is applied. The locking circuit 17 includes a gate which is opened by means of a gating pulse shaped such that the central portion of the discriminator pulses is passed through the gate to a following memory circuit, for example a capacitor, whereafter the gate is closed and kept closed during the whole listening time interval. The memory circuit then maintains the value of the discriminator pulse during the listening interval. The pulses delivered by the locking circuit 17 produces the said rapid frequency correction and are shown in the diagram $(d)$ in FIG. 4, where they are designated $P_{AFR}$.

The pulses $P_{AFR}$ are on the one hand fed directly to an adding device 18 and on the other hand to an integrator 19, which has such a large time constant that it delivers a magnitude, which represents the mean value of a large number of foregoing pulses $P_{AFR}$. To the integrator 19 is also applied the output voltage from the echo time flip-flop 11, which output voltage is used to activate the integrator so that output voltage from the same is obtained only during the listening time interval. The output voltage from the integrator is shown in the diagram $(e)$ in FIG. 4.

The output voltage from the integrator 19 is fed via an adding device 20 to a second input of the adding device 18. If for the moment the second voltage fed to the adding device 20 is left out of consideration an output voltage is obtained from the device 18 which is shown in the diagram $(g)$ in FIG. 4. This voltage is fed via a correction circuit 21 to the control unit 10 for producing a corresponding frequency correction of the oscillator 3. As control voltage to the correction circuit 21 is used the voltage which is applied to the oscillator 3 in the follow regulation circuit and which voltage represents the instantaneous frequency of the oscillator. The correction circuit 21 has for its purpose the compensate for the nonlinearity present in the control circuits of the oscillator so that a measured frequency difference gives rise to one and the same frequency correction independently of where upon the tuning curve triggering occurs.

As a result of the fact that the integrator 19 stores information about the measured frequency deviations from pulse to pulse and the output voltage of the integrator is used to influence the local oscillator frequency, which in turn determines the frequency deviation and consequently the input signal of the integrator, a closed regulation circuit is formed via the integrator. In this circuit the frequency of the oscillator is controlled by negative feedback such that the mean value of a large number of foregoing correction pulses $P_{AFR}$ will be zero.

According to the invention the described correction arrangement is combined with a further correction circuit designated 22 in FIG. 1. The construction and function of the correction circuit 22 is now explained more closely under reference to the diagrams $(h)-(q)$ in FIG. 4.

The correction circuit 22 consists of a differentiating circuit 23, an amplifier 24, a locking circuit 25 and a gate 28. As control signal to the circuit 22 is used the voltage which influences the local oscillator in the follow regulation circuit and which voltage represents the local oscillator frequency and thereby in the interval before triggering also the tuning frequency of the magnetron. This control signal is fed to the differentiation circuit 23 producing a voltage which is proportional to the derivative of the control signal. This voltage is shown in the diagram $(h)$ in FIG. 4. The signal obtained by the differentiation is applied after amplification in the amplifier 24 to the locking circuit 25, which is further controlled with the output voltage from the echo time flip-flop 11. The locking circuit 25 consists of a gate 26, which is kept open during the slave interval before triggering, and a memory connected to the output of the gate, for example in the shape of a capacitor 27, which receives the amplified derivative signal passed through the gate. The gate 26 of the locking circuit 25 is closed at triggering and is then kept closed during the whole listening time interval, and the memory 27 will then maintain the derivative value which was present in the triggering moment during the listening interval. The output voltage of the locking circuit is shown in the diagram $(j)$ in FIG. 4. This voltage is fed through the gate 28 which is also controlled by the voltage from the echo time flip-flop 11. The gate 28 is kept closed during the slave interval and is opened at triggering, whereafter it is kept open during the listening interval. The gate 28 will hereby block the varying derivative voltage coming from the locking circuit 25 during the slave interval and only pass the constant voltage representing the derivative value in the triggering moment, which appears at the output of the locking circuit 25 after triggering. The voltage obtained from the gate 28 is shown by the diagram $(m)$ in FIG. 4. This voltage representing the derivative value in the triggering moment is added in the adding device 20 to the simultaneously appearing voltage from the integrator 19. The sum signal is then combined in the adding device 18 with the correction pulses from the locking circuit 17. The voltage pulses from the integrator 19, shown in diagram $(o)$ in FIG. 4, are as before regulated in the closed regulation circuit such that the mean value of a number of foregoing correction pulses is zero. The correction pulses for this case are shown in the diagram $(p)$ in FIG. 4, where they are designated $p'_{AFR}$.

The adding device 18 delivers an output voltage, which represents the sum of the pulses from the looking circuits 17 and 25 and the integration 19. This voltage which is shown in diagram $(q)$ in FIG. 4 is led to the correction circuit 21 and used to control the frequency of the oscillator 3 as previously described.

The additional correction introduced by the correction circuit 22 varies from pulse to pulse and is made in an open regulation circuit. The regulation constant in this circuit is adjusted such that the absolute value of the correction pulses $p'_{AFR}$ will be minimum. The amplification in the circuit 22 may for example be adjusted manually under observation of the correction pulses until these will have minimum amplitude. The amplification and thereby the regulation constant in the circuit 22 is thereafter kept constant. The correction obtained by the correction circuit 22 compensates for such deviations in the difference frequency which are dependent upon where on the tuning curve triggering occurs, in first hand the deviation which is a result of the fact that the tuning frequency changes its value during the interval from the triggering moment, when the frequency is measured, to the transmission moment, which deviation is dependent upon the speed of the tuning change in the triggering moment. Also deviations of other kind depending upon where on the tuning curve triggering occurs can be compensated by this further correction, as for example hysteresis phenomena in the tuning curve. As a result of the fact that a portion of the required rapid pulse-to-pulse correction has already been made in shape of a precorrection in the triggering moment the required final correction which is carried through after the transmission moment is made smaller, as indicated in FIG. 4 by the size of the correction pulses $p'_{AFR}$ as compared with the pulses $P_{AFR}$ which refers to the case without additional precorrection.

In the shown example there is a linear relationship between the derivative dependent, additional frequency correction and the measured derivative value in the triggering moment. If required, however, some suitable nonlinear function can be introduced also in the circuit 22 besides the nonlinearity present in the correction circuit 21, which compensates for nonlinearity in the control circuits of the oscillator.

What is claimed is:

1. A device for frequency correction in a radar equipment comprising a tunable transmitter tube (2) with means for continuous variation of the tuning frequency of the transmitter tube and means (5) for instantaneous excitation, triggering, of the transmitter tube for generation and transmission of radar pulses of varying frequency, and a receiver comprising a local oscillator (3) which by means of memory means (9) is locked in frequency at triggering to a value which is related in a certain manner to the frequency of the transmitted pulse, upon which value it is then maintained a predetermined time after triggering for producing a predetermined constant intermediate frequency in combination with received echo pulses, a frequency discriminator (16) being arranged for the purpose of frequency correction of the local oscillator after the transmission, to which discriminator is applied the difference frequency between the transmitted pulse and the locked oscillator frequency in the transmission moment and which discriminator delivers a voltage pulse representing the deviation of the said difference frequency from the predetermined intermediate frequency, and memory means (17) for storing the value of the voltage pulse during the echo time interval, which pulse is applied to the frequency determining means of the local oscillator (3) for correcting the oscillator frequency at the transmission, characterized by a further correction circuit (22) comprising means (23) which are sensitive for the tuning variation of the transmitter tube with time, i.e. the derivative of the tuning curve, and memory means (27) for storing the derivative value existing in the triggering moment during the echo time interval, which memory means are adapted to influence the frequency determining means of the local oscillator in the triggering moment for producing a correction of the oscillator frequency appearing in time before the transmission moment and corresponding to the derivative value.

2. A device as claimed in claim 1, characterized in that the correction pulses from the said memory means (27) adapted to store the derivative value in the triggering moment during the echo interval are superimposed upon correction pulses obtained from a device (19) having a large time constant, which device is fed with the pulses from the discriminator (16), the pulses produced by the said device having large time constant being also adapted to produce a precorrection of the local oscillator, which is such that the mean value of a large number of foregoing discriminator pulses will be substantially equal to zero.

3. A device as claimed in claim 1 wherein the correction produced by said further derivative sensitive correction circuit is substantially proportional to the measured derivative in the triggering moment.

4. A device as claimed in claim 1 whereas said local oscillator is locked in frequency at triggering so that the frequency thereof in an interval before triggering in each triggering moment equals the tuning frequency of the transmitted tube in an unexcited condition.

5. A device as claimed in claim 1 wherein said further corrections circuit comprises a differentiating circuit for receiving a control voltage produced by continuous measurement of the tuning frequency of the tunable transmitter tube to produce a voltage proportional to the derivative of said control voltage, memory means for storing the derivative voltage from said differentiating circuit, and gating means connected to said memory means for applying the derivative voltage to the frequency determining means of said oscillator in an interval before triggering in each triggering moment.

6. A device as claimed in claim 1 wherein said memory means comprises a capacitor.